(12) United States Patent
Kinjo et al.

(10) Patent No.: US 11,522,404 B2
(45) Date of Patent: Dec. 6, 2022

(54) ELECTRIC ACTUATOR INCLUDING SEAL MEMBER IN LID GROOVE

(71) Applicant: NIDEC TOSOK CORPORATION, Kanagawa (JP)

(72) Inventors: Shuichi Kinjo, Kanagawa (JP); Hiroshi Shirai, Kanagawa (JP); Yutaka Uematsu, Kanagawa (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 390 days.

(21) Appl. No.: 16/747,552

(22) Filed: Jan. 21, 2020

(65) Prior Publication Data

US 2020/0244140 A1 Jul. 30, 2020

(30) Foreign Application Priority Data

Jan. 30, 2019 (JP) .............................. JP2019-014681

(51) Int. Cl.
*H02K 5/22* (2006.01)
*H02K 5/08* (2006.01)
*H02K 5/06* (2006.01)

(52) U.S. Cl.
CPC ................. *H02K 5/22* (2013.01); *H02K 5/06* (2013.01); *H02K 5/08* (2013.01)

(58) Field of Classification Search
CPC .. H02K 5/22; H02K 5/10; H02K 5/06; H02K 5/08; H02K 5/12; H02K 5/04; H02K 7/116; H02K 11/38
USPC ..... 251/129.11, 129.12, 129.13; 310/89, 413
See application file for complete search history.

(56) References Cited

U.S. PATENT DOCUMENTS

| 2013/0217531 | A1* | 8/2013 | Kume | H02K 7/116 475/149 |
| 2014/0021808 | A1* | 1/2014 | Palfenier | H02K 11/33 310/43 |
| 2016/0165736 | A1* | 6/2016 | Tsuboi | H02K 11/33 174/50.54 |
| 2017/0237312 | A1* | 8/2017 | Stewart | H02K 11/33 310/68 B |
| 2020/0244140 | A1* | 7/2020 | Kinjo | H02K 5/22 |

FOREIGN PATENT DOCUMENTS

| CN | 108365691 A | * | 8/2018 | ............... H02K 5/04 |
| JP | 2009247139 | | 10/2009 | |

OTHER PUBLICATIONS

CN-108365691-A (English Translation) (Year: 2018).*

* cited by examiner

*Primary Examiner* — John K Kim
(74) *Attorney, Agent, or Firm* — JCIPRNET (57) ABSTRACT

An electric actuator includes a motor which has a rotor having a motor shaft extending along a central axis and a stator facing the rotor in a radial direction, a motor case for housing the motor, and a deceleration mechanism coupled to one axial side of the motor shaft. The motor case has a case cylinder portion, a lid for covering, and a plurality of screws. The case cylinder portion has a plurality of screw fixing portions. The lid has a top plate portion, an outer cylinder portion which surrounds the case cylinder portion from a radial outer side, an annular groove portion, and a seal member which seals the opening portion of the case cylinder portion. In the lid, an axial thickness of a region which overlaps the annular groove portion as viewed in the axial direction is larger than an axial thickness of the top plate portion.

8 Claims, 5 Drawing Sheets

ELECTRIC ACTUATOR INCLUDING SEAL MEMBER IN LID GROOVE

CROSS-REFERENCE TO RELATED APPLICATION

This application claims the priority benefit of Japan Application No. 2019-014681, filed on Jan. 30, 2019. The entirety of the above-mentioned patent application is hereby incorporated by reference herein and made a part of this specification.

BACKGROUND

Technical Field

The disclosure relates to an electric actuator.

Related Art

Conventionally, in a motor with a built-in control board inside a case, a seal member is disposed on a mating surface of the case in order to ensure waterproofness of a case part which houses the control board (see patent literature 1).

LITERATURE OF RELATED ART

Patent Literature

[Patent literature 1] Japanese Patent Laid-open No. 2009-247139

SUMMARY

In a configuration in which case components clamping the seal member are fixed with screws, the case components may be deformed by a reaction force of the seal member at positions away from the screws. Due to the deformation of the case components, a pressure applied to the seal member is weakened, and the sealing performance may be insufficient.

According to one aspect of the disclosure, an electric actuator is provided which includes a motor which has a rotor having a motor shaft extending along a central axis and a stator facing the rotor in a radial direction, a motor case for housing the motor, and a deceleration mechanism coupled to one axial side of the motor shaft. The motor case has a case cylinder portion which houses the stator and has an opening portion being open to the other axial side, a lid which covers the opening portion of the case cylinder portion, and a plurality of screws for fastening the lid to the case cylinder portion. The case cylinder portion has a plurality of screw fixing portions having screw holes which are open on an end surface on the other axial side of the case cylinder portion. The lid has a top plate portion covering the opening portion of the case cylinder portion, an outer cylinder portion extending in an axial direction from an outer peripheral edge of the top plate portion and surrounding the case cylinder portion from a radial outer side, an annular groove portion which is positioned inside the outer cylinder portion and faces the end surface on the other axial side of the case cylinder portion in the axial direction, and a seal member which is housed in the annular groove portion and seals the opening portion of the case cylinder portion. In the lid, an axial thickness of a region which overlaps the annular groove portion as viewed in the axial direction is larger than an axial thickness of the top plate portion.

According to the aspect of the disclosure, an electric actuator having a sufficient sealing performance at connecting portions between case components is provided.

DESCRIPTION OF THE EMBODIMENTS

In each diagram, a Z-axis direction is a vertical direction in which a positive side is an upper side and a negative side is a lower side. An axial direction of a central axis J1 which is appropriately shown in each diagram is parallel to the Z-axis direction, that is, the vertical direction. In the following description, a direction parallel to the axial direction of the central axis J1 is simply referred to as the "axial direction Z". In addition, an X-axis direction and a Y-axis direction which are appropriately shown in the diagrams are horizontal directions orthogonal to the axial direction Z and are directions orthogonal to each other. In the following description, a direction parallel to the X-axis direction is referred to as a "first direction X", and a direction parallel to the Y-axis direction is referred to as a "second direction Y".

In addition, a radial direction with the central axis J1 as the center is simply referred to as a "radial direction", and a circumferential direction with the central axis J1 as the center is simply referred to as a "circumferential direction". In the embodiment, the upper side corresponds to the other axial side, and the lower side corresponds to one axial side. Furthermore, the vertical direction, the horizontal direction, the upper side, and the lower side are simply terms for explaining relative positional relationships between each part, and actual arrangement relationships may be arrangement relationships or the like other than arrangement relationships indicated by these terms or the like.

Figure 1:
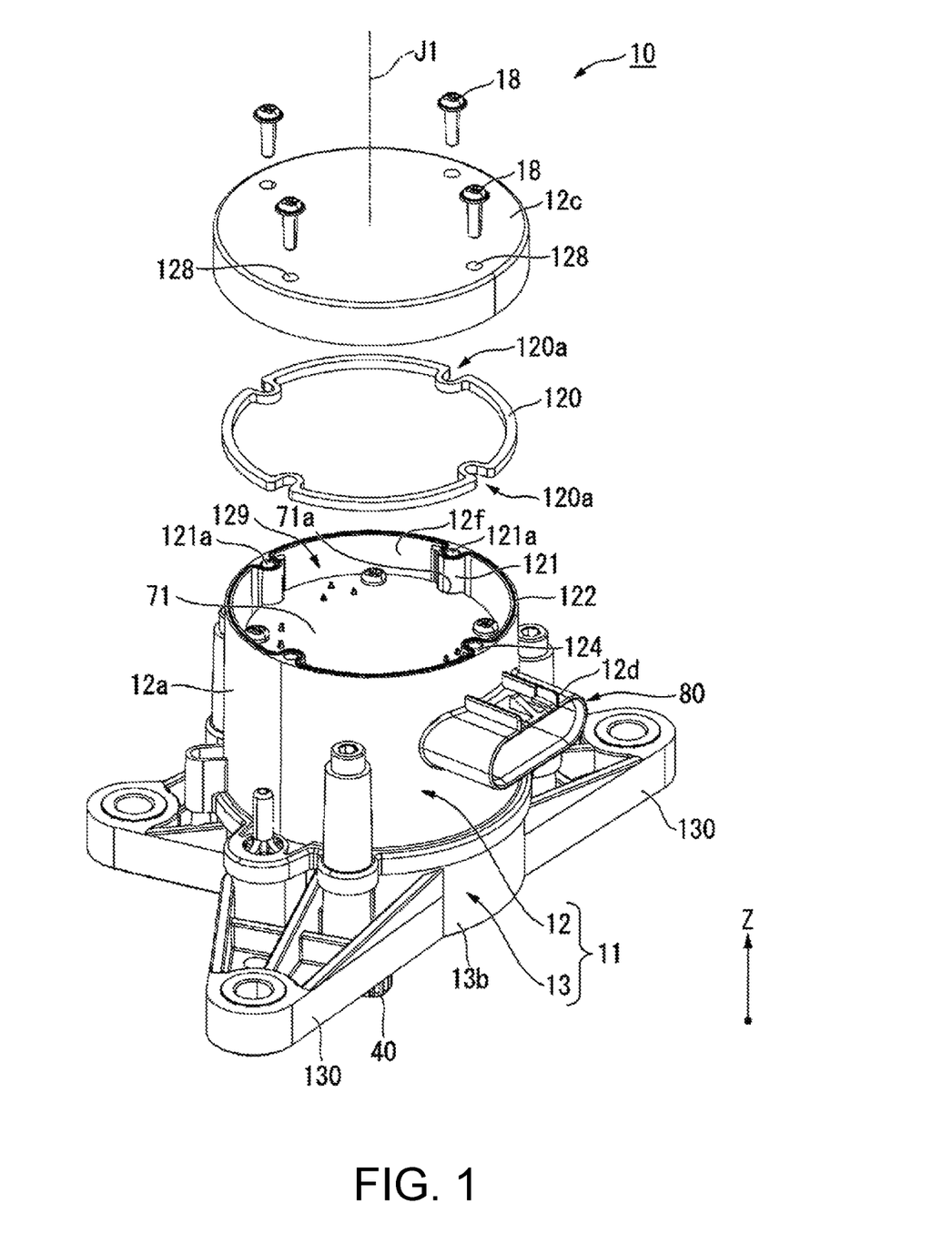
FIG. 1 is an exploded perspective view of an electric actuator according to an embodiment.
Figure 2:
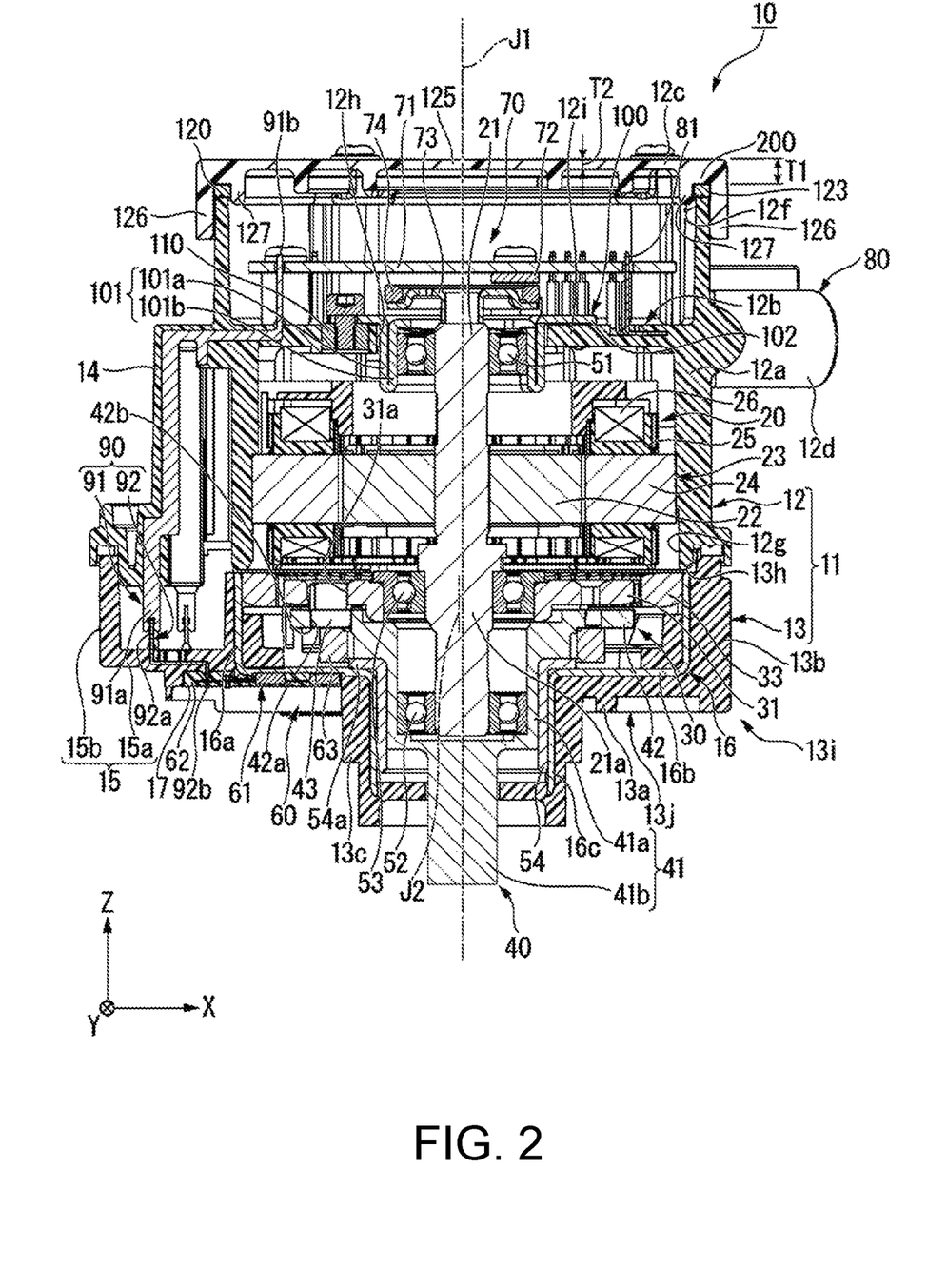
FIG. 2 is a cross-sectional view of the electric actuator according to the embodiment.

As shown in FIG. 1 and FIG. 2, an electric actuator 10 of the embodiment includes a case 11, a bearing holder 100, a motor 20 having a motor shaft 21 extending in the axial direction Z of the central axis J1, a control portion 70, a connector portion 80, a deceleration mechanism 30, an output portion 40, wiring members 90, a rotation detection device 60, a first bearing 51, a second bearing 52, a third bearing 53, and a bush 54. The first bearing 51, the second bearing 52, and the third bearing 53 are, for example, ball bearings.

The case 11 houses the motor 20 and the deceleration mechanism 30. The case 11 includes a motor case 12 which houses the motor 20 and a deceleration mechanism case 13 which houses the deceleration mechanism 30. That is, the electric actuator 10 has the motor case 12. The motor case 12 includes a case cylinder portion 12a, a wall portion 12b, a control board housing portion 12f, a lid 12c, a terminal holding portion 12d, and a first wiring holding portion 14. Each portion of the motor case 12 is made of resin except for a metal member 110 described later.

The case cylinder portion 12a has a circular-cylindrical shape extending in the axial direction Z with the center axis J1 as the center. The case cylinder portion 12*a* is open on both sides in the axial direction Z. The case cylinder portion 12*a* has an opening portion 129 which is open at an upper side and an opening portion 12*g* which is open at a lower side. The case cylinder portion 12*a* surrounds a radial outer side of the motor 20.

The wall portion 12*b* has a circular annular shape which expands radially inward from an inner peripheral surface of the case cylinder portion 12*a*. The wall portion 12*b* covers an upper side of a stator 23 described later of the motor 20. The wall portion 12*b* has a hole portion 12*h* which penetrates the wall portion 12*b* in the axial direction Z. In the embodiment, the hole portion 12*h* has a circular shape with the central axis J1 as the center. An inner diameter of the hole portion 12*h* is larger than an outer diameter of a holder cylinder portion 101 described later. The wall portion 12*b* includes a wall portion body 12*i* made of resin and the metal member 110 made of metal. The wall portion body 12*i* is a circular annular portion which expands radially inward from the inner peripheral surface of the case cylinder portion 12*a*.

The metal member 110 has a circular annular shape and has a female thread portion on the inner peripheral surface. The metal member 110 is a nut for example. The metal member 110 is embedded in the wall portion body 12*i*. The metal member 110 is located at a position separated radially outward from a radial inner surface of the hole portion 12*h*. A plurality of metal members 110 is arranged. The plurality of metal members 110 is disposed at equal intervals over an entire circumference along the circumferential direction. For example, three metal members 110 are arranged.

The control board housing portion 12*f* is a part for housing a control board 71 described later. The control board housing portion 12*f* is configured on a radial inner side of an upper part of the case cylinder portion 12*a*. A bottom surface of the control board housing portion 12*f* is a top surface of the wall portion 12*b*. The control board housing portion 12*f* is open at an upper side. The lid 12*c* is a plate-like lid which closes an upper end opening of the control board housing portion 12*f*. The terminal holding portion 12*d* protrudes radially outward from the case cylinder portion 12*a*. The terminal holding portion 12*d* has a circular-cylindrical shape which is open at a radial outer side. The terminal holding portion 12*d* holds a terminal 81 described later.

The lid 12*c* closes an opening portion 129 which is open at an upper side of the case cylinder portion 12*a*. The lid 12*c* closes an opening on an upper side of the control board housing portion 12*f* positioned on the upper side of the case cylinder portion 12*a*. The lid 12*c* is removably mounted to the opening portion 129 of the case cylinder portion 12*a* using four screws 18.

As shown in FIG. 1, in the control board housing portion 12*f*, the motor case 12 has screw fixing portions 121 at four locations which protrude radially inward from the inner peripheral surface of the case cylinder portion 12*a*. The screw fixing portions 121 extend in the axial direction. A height position in the vertical direction of upper end portions of the screw fixing portions 121 is coincident with a height position in the vertical direction of an end surface 124 on the upper side of the case cylinder portion 12*a*. The motor case 12 has screw holes 121*a* which are open at a surface facing the upper side of the screw fixing portions 121.

By the screw fixing portions 121 being positioned on an inner surface side of the case cylinder portion 12*a*, the motor case 12 is prevented from being enlarged in the radial direction. In addition, by the screw fixing portions 121 having a shape extending in the axial direction on the inner surface of the case cylinder portion 12*a*, the screw fixing portions 121 become ribs and strength of the motor case 12 is improved. By disposing the screw fixing portions 121 at equal intervals in the circumferential direction, the case cylinder portion 12*a* is evenly reinforced in the circumferential direction, and thus the overall strength is increased.

In the case of the embodiment, the control board 71 is substantially circular when viewed from above and has arc-shaped cutout portions 71*a* at four locations at an outer peripheral end. The screw fixing portions 121 are inserted into the cutout portions 71*a* at four locations from the radial outer side, respectively. With this configuration, the screw fixing portions 121 can be used for alignment of the control board 71.

On the end surface 124 at the upper side of the case cylinder portion 12*a*, the motor case 12 has an annular convex portion 122 extending along the end surface 124. The annular convex portion 122 surrounds the opening portion 129 being open at the upper side of the case cylinder portion 12*a* and protrudes upward. The annular convex portion 122 is positioned in a center portion of a radial width of the end surface 124 in a part other than the screw fixing portion 121 in the end surface 124, the part extending along the circumferential direction. The annular convex portion 122 extends around radial inner sides of the screw holes 121*a* in the screw fixing portions 121. The annular convex portion 122 passes through the inside of the screw holes 121*a*, and thereby moisture can be prevented from entering the inside of the motor case 12 even when moisture enters screw fastening parts.

Figure 3:
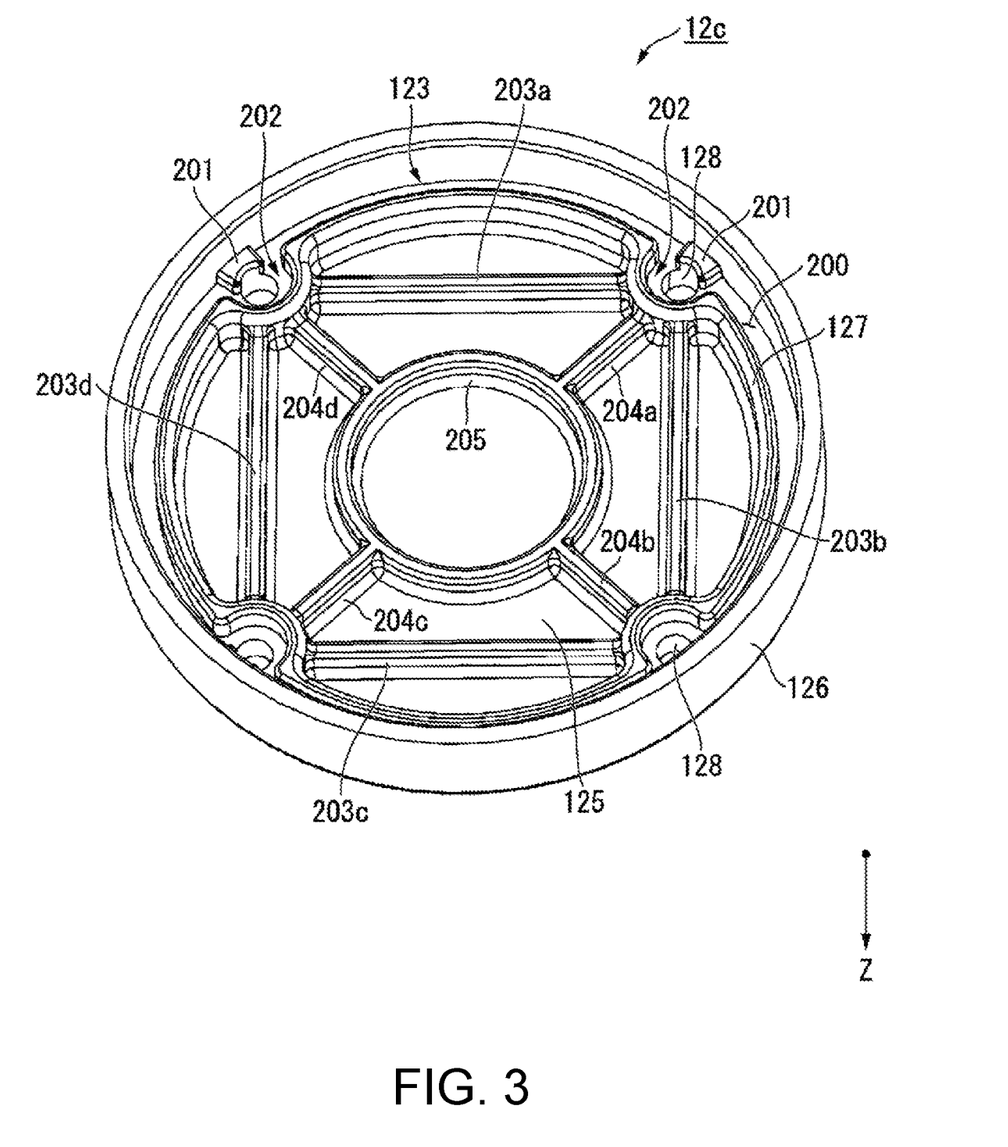
FIG. 3 is a perspective view showing an inner side of a lid.

As shown in FIGS. 1 to 3, the lid 12*c* includes a top plate portion 125 which covers the opening portion 129 of the case cylinder portion 12*a*, an outer cylinder portion 126 which extends in the radial direction from an outer peripheral edge of the top plate portion 125 and surrounds the case cylinder portion 12*a* from the radial outer side, and an inner cylinder portion 127 which extends downward from a surface facing a lower side of the top plate portion 125. The lid 12*c* has an annular groove portion 123 which is positioned between the outer cylinder portion 126 and the inner cylinder portion 127 and faces the upper end surface of the case cylinder portion 12*a* in the axial direction. The lid 12*c* has a seal member 120 which is housed in the annular groove portion 123 and seals the opening portion 129 of the case cylinder portion 12*a*.

The lid 12*c* has four screw insertion holes 128 which penetrate the lid 12*c* in the axial direction and are open on a bottom surface of the annular groove portion 123. The four screw insertion holes 128 are disposed at equal intervals in the circumferential direction. As shown in FIG. 3, the annular groove portion 123 has a larger radial width in the parts where the screw insertion holes 128 are arranged than in other parts. Since the screw insertion holes 128 which are open inside the annular groove portion 123 are positioned at the inner side of the outer cylinder portion 126, parts for screwing the lid 12*c* do not protrude to the outer side of the outer cylinder portion 126. Thereby, an outer diameter of the motor case 12 can be reduced, and enlargement of the electric actuator 10 can be suppressed.

The lid 12*c* has a base portion 200 which protrudes downward from a surface facing a lower side of the top plate portion 125. The base portion 200 has an annular shape which extends along an outer periphery of the top plate portion 125. That is, in a region overlapping the annular groove portion 123 as viewed in the axial direction, the lid 12*c* has the base portion 200 being annular and protruding below the top plate portion 125. According to this configuration, as shown in FIG. 2, a thick part where the top plate portion 125 and the base portion 200 overlap in the vertical direction is arranged above the annular groove portion 123. In the lid 12c, an axial thickness T1 of the region overlapping the annular groove portion 123 as viewed in the axial direction is larger than an axial thickness T2 of the top plate portion 125 which is closer to the radial inner side than the annular groove portion 123.

The outer cylinder portion 126 extends downward from an outer peripheral end of the base portion 200. The inner cylinder portion 127 extends downward from an inner peripheral end of the base portion 200. The surface facing the lower side of the base portion 200 and positioned between the outer cylinder portion 126 and the inner cylinder portion 127 configures the bottom surface of the annular groove portion 123. An inner peripheral surface of the outer cylinder portion 126 and an outer peripheral surface of the inner cylinder portion 127 which face each other in the radial direction configures a side surface of the annular groove portion 123.

The lid 12c has four claw portions 201 which protrude downward from the bottom surface of the annular groove portion 123. The four claw portions 201 are positioned on the radial outer sides of the four screw insertion holes 128, respectively. End portions on radial inner sides of the claw portions 201 are aligned with end portions on the radial outer side of the screw insertion holes 128 as viewed in the axial direction. End portions on the radial outer side of the claw portions 201 are in contact with the inner peripheral surface of the outer cylinder portion 126.

The base portion 200 has protrusion portions 202 which protrude radially inward at four locations in the circumferential direction. The screw insertion holes 128 penetrate a part including the protrusion portions 202 in the base portion 200 in the axial direction. By arranging the protrusion portions 202, it is easy to secure spaces for the screw insertion holes 128. The bottom surface of the annular groove portion 123 extends in an arc shape around the inner side of the screw insertion hole 128, and extends around an outer peripheral portion of the lid 12c as viewed in the axial direction.

Figure 4:
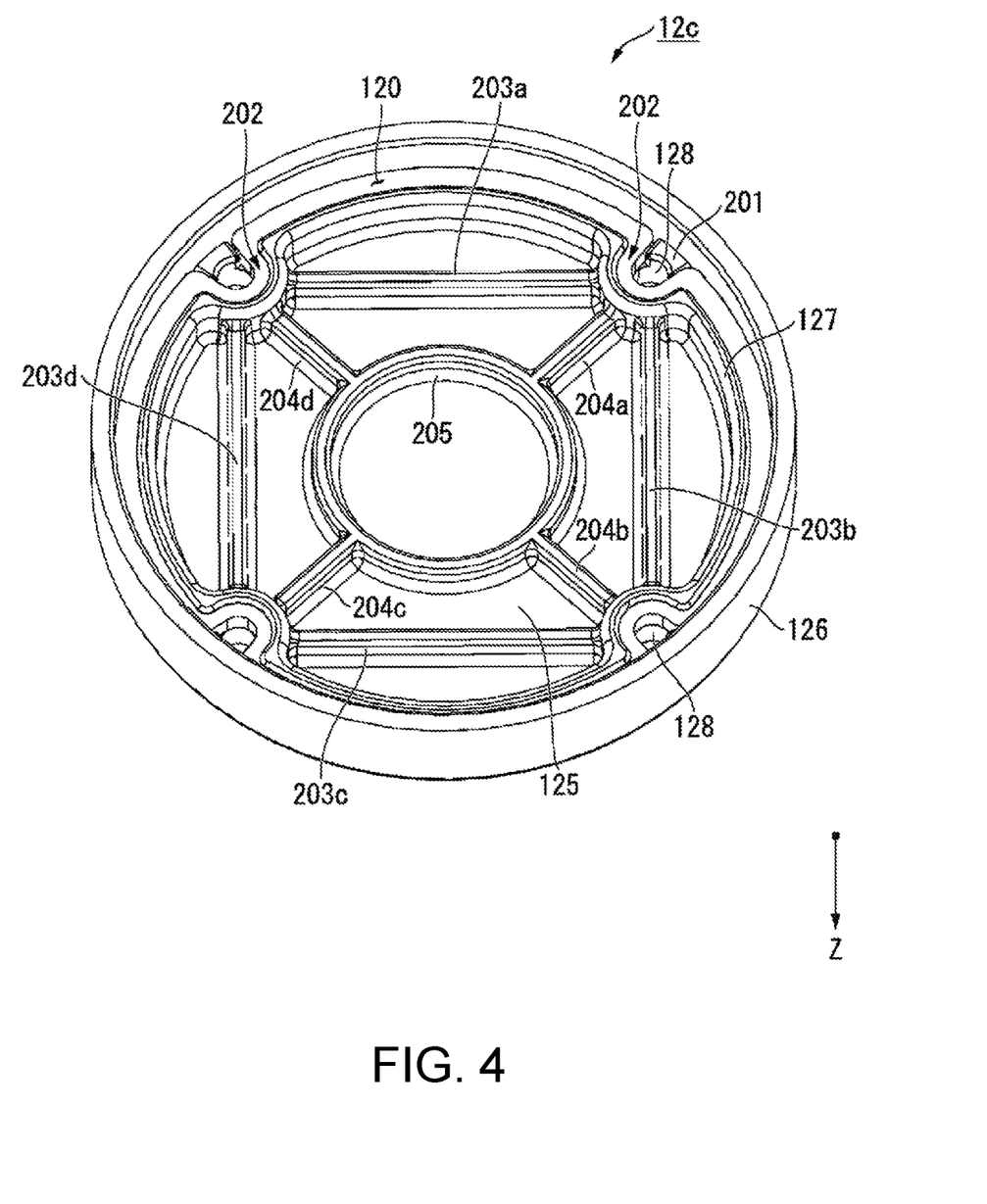
FIG. 4 is a perspective view of the lid showing a state in which a seal member is attached to an annular groove portion.

The seal member 120 is, for example, a thin plate-shaped ring made of a rubber material. The seal member 120 has substantially the same planar shape as the bottom surface of the annular groove portion 123. That is, the seal member 120 has a substantially circular annular shape extending along the circumferential direction, and has inner protrusion portions 120a which protrude in an arc shape radially inward at four locations in the circumferential direction.

The seal member 120 is housed in the annular groove portion 123. As shown in FIGS. 3 and 4, the seal member 120 is disposed on the bottom surface of the annular groove portion 123. The inner protrusion portions 120a pass through the radial inner sides of the screw insertion hole 128 in a state that the seal member 120 is housed in the annular groove portion 123. The screw insertion holes 128 and the claw portions 201 are disposed at inner sides of the inner protrusion portions 120a.

Figure 5:
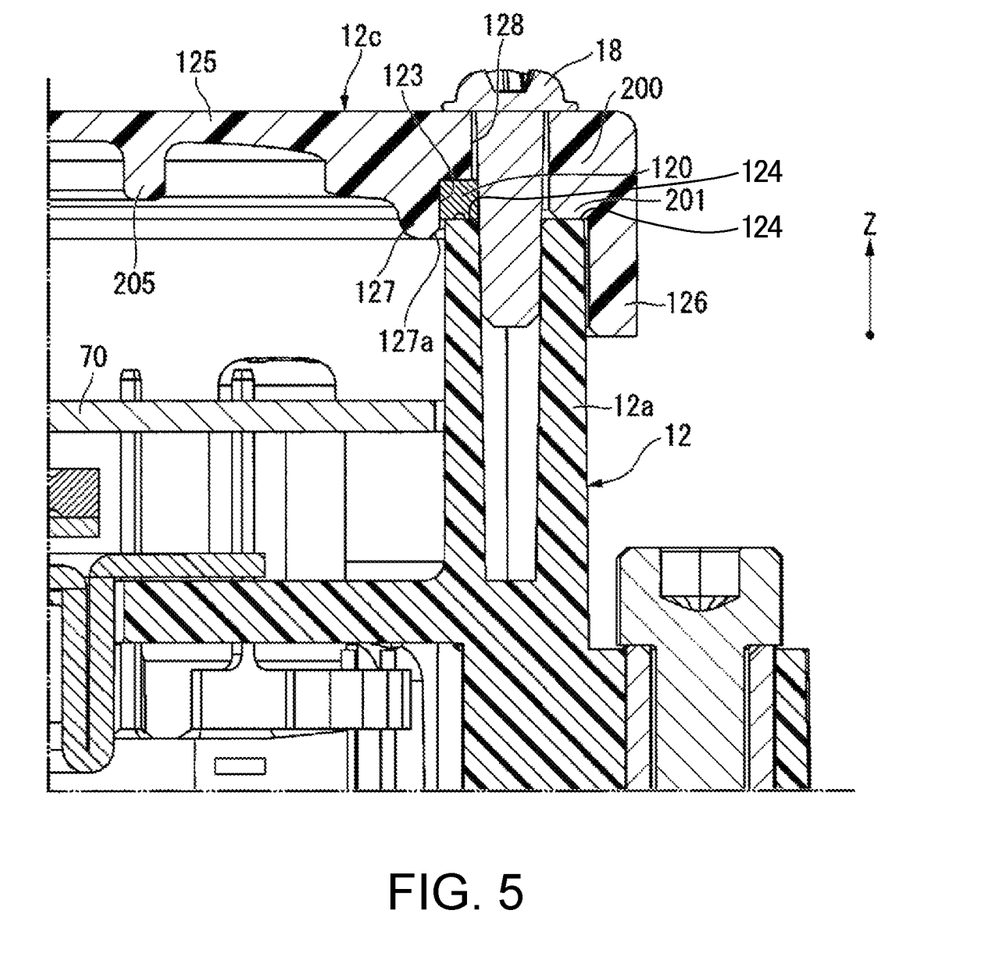
FIG. 5 is a partial cross-sectional view of an electric actuator showing an attachment part of the lid.

As shown in FIG. 5, the lid 12c covers the opening portion 129 of the case cylinder portion 12a in a state that the seal member 120 is housed in the annular groove portion 123. An upper end portion of the case cylinder portion 12a is inserted into the outer cylinder portion 126 of the lid 12c. The end surface 124 of the case cylinder portion 12a is inserted into the annular groove portion 123 of the lid 12c. The screws 18 are tightened into the screw holes 121a through the screw insertion holes 128 of the lid 12c.

The seal member 120 is clamped between the bottom surface of the annular groove portion 123 and the annular convex portion 122 by fastening forces of the screws 18. The seal member 120 is elastically deformed by the annular convex portion 122 and is strongly pressed against the bottom surface of the annular groove portion 123. Thereby, a contact portion between the case cylinder portion 12a and the lid 12c is sealed. According to this configuration, even when the screws 18 are somewhat loosened, the annular convex portion 122 presses the seal member 120, and thereby close contact of the seal part can be maintained.

As shown in FIG. 5, the claw portions 201 are abutted against the end surface 124 in a state that the lid 12c is attached to the case cylinder portion 12a. The claw portions 201 maintain a constant axial distance between the end surface 124 and the bottom surface of the annular groove portion 123. Thereby, an elastic deformation width of the seal member 120 in the axial direction becomes uniform in the circumferential direction, and an appropriate sealing performance can be obtained over the entire circumference of the seal member 120.

In the embodiment, as shown in FIG. 5, the upper end portion of the case cylinder portion 12a is disposed inside the annular groove portion 123 in a state that the lid 12c is attached to the case cylinder portion 12a. Thereby, the seal part between the lid 12c and the case cylinder portion 12a is covered by the outer cylinder portion 126 and the inner cylinder portion 127 from both sides in the radial direction, and the outer cylinder portion 126 and the inner cylinder portion 127 extend further downward from the seal part. According to this configuration, since the outer cylinder portion 126 extends much downward than the position of the seal member 120, it is difficult for water droplets to enter the seal part. Thereby, the electric actuator 10 which does not leak when the screws are somewhat loosened can be achieved.

According to the configurations of the lid 12c and the case cylinder portion 12a described above, in the lid 12c, the thick part is arranged by disposing the base portion 200 in the region overlapping the annular groove portion 123, and it is configured in a manner that the outer cylinder portion 126 of the lid 12c surrounds the case cylinder portion 12a from the radial outer side, thereby improving strength of an outer peripheral part of the lid 12c. Accordingly, when the lid 12c is attached to the case cylinder portion 12a, deformation of the lid 12c due to the reaction force of the seal member 120 can be suppressed. Since the lid 12c is not easily deformed, pressure applied to the seal member 120 can be suppressed from being weakened, and a sufficient sealing property can be obtained at the seal part between the lid 12c and the case cylinder portion 12a.

In addition, in the embodiment, the thick part of the lid 12c is configured by arranging the base portion 200 protruding downward from the top plate portion 125. Thereby, the surface facing the upper side of the top plate portion 125 can be a flat surface. The electric actuator 10 with less unevenness of the lid 12c and easily installed in equipment can be made. In addition, since the base portion 200 is arranged at an inner corner of the connection part between the top plate portion 125 and the outer cylinder portion 126, the connection part between the top plate portion 125 and the outer cylinder portion 126 can be reinforced, and the lid 12c is more difficult to deform.

In addition, in the lid 12c of the embodiment, the annular groove portion 123 which houses the seal member 120 is a groove portion taking the outer cylinder portion 126 and the inner cylinder portion 127 as side walls, and the outer cylinder portion 126 extends further downward than the inner cylinder portion 127. By extending the outer cylinder portion 126 long downward, the strength at the outer peripheral portion of the lid 12c can be further increased. Thereby, the deformation of the lid 12c due to the reaction force of the seal member 120 can be further suppressed, and the decrease in the sealing performance due to the deformation of the lid 12c can be further reduced. In addition, since the overlapping part between the outer cylinder portion 126 and the case cylinder portion 12a becomes longer as viewed in the radial direction, the lid 12c is less likely to tilt with respect to the case cylinder portion 12a. Accordingly, the lid 12c can be easily disposed in a correct posture with respect to the case cylinder portion 12a, and assembly operation of the electric actuator 10 can be easily performed.

In addition, in the embodiment, as shown in FIG. 5, a tapered surface 127a which is inclined with respect to the axial direction is arranged at a connection boundary portion between an end surface facing the lower side of the inner cylinder portion 127 and the outer peripheral surface of the inner cylinder portion 127. The tapered surface 127a guides the end surface 124 of the case cylinder portion 12a to the surface facing the lower side of the seal member 120 when the lid 12c covers the case cylinder portion 12a. Thereby, it is difficult for the end surface 124 of the case cylinder portion 12a to be caught by the inner cylinder portion 127, and assembly operation of the lid 12c can be easily performed.

As shown in FIG. 3, the lid 12c has a plurality of ribs 203a to 203d, 204a to 204d, and 205 which protrudes downward from the top plate portion 125. The four ribs 203a, 203b, 203c, and 204d are connected to a plurality of locations on the side surface of the base portion 200 facing radially inward. By the lid 12c having the ribs, the strength of the lid 12c is improved. Thereby, the deformation of the lid 12c due to the reaction force of the seal member 120 is suppressed, and the decrease in the sealing performance due to the deformation of the lid 12c is suppressed.

In the embodiment, the four ribs 203a to 203d arranged in the vicinity of the inner cylinder portion 127 connect the protrusion portions 202 at four locations of the base portion 200 to each other. According to this configuration, a crossing angle between the ribs 203a to 203d and the side surface of the base portion 200 is close to a right angle as viewed in the axial direction, and thus a reinforcing effect by the ribs 203a to 203d is further enhanced.

The four ribs 204a, 204b, 204c, and 204d extend radially inward from the side surfaces of respective protrusion portions 202 at four locations toward a center of the lid 12c. End portions on the radially inner sides of the ribs 204a to 204d are connected to a side surface facing radially outward of the rib 205 being circular annular and positioned at the center portion of the lid 12c. Similarly to the ribs 203a to 203d, the ribs 204a to 204d and 205 connect the plurality of protrusion portions 202 to each other. By the lid 12c including the ribs 204a to 204d and 205, deformation of the top plate portion 125 can be suppressed without depending on a bending direction. Thereby, generation of noise due to vibration of the lid 12c is also suppressed.

As shown in FIG. 2, the first wiring holding portion 14 protrudes radially outward from the case cylinder portion 12a. In FIG. 2, the first wiring holding portion 14 protrudes from the case cylinder portion 12a toward the negative side in the first direction X. The first wiring holding portion 14 extends in the axial direction Z. An axial position of an upper end portion of the first wiring holding portion 14 is substantially the same as an axial position of the wall portion 12b. A circumferential position of the first wiring holding portion 14 is, for example, different from a circumferential position of the connector portion 80.

The deceleration mechanism case 13 is positioned below the motor case 12. The deceleration mechanism case 13 includes a deceleration mechanism case body 13i and a circular cylindrical member 16. The deceleration mechanism case body 13i is made of resin. The deceleration mechanism case body 13i includes a bottom wall portion 13a, a cylinder portion 13b, a protruding cylinder portion 13c, and a second wiring holding portion 15. The bottom wall portion 13a has a circular annular shape with the central axis J1 as the center. The bottom wall portion 13a covers a lower side of the deceleration mechanism 30.

The cylinder portion 13b has a circular cylindrical shape protruding upward from a radial outer edge portion of the bottom wall portion 13a. The cylinder portion 13b is open on the upper side. An upper end portion of the cylinder portion 13b is fixed in contact with a lower end portion of the case cylinder portion 12a. The protruding cylinder portion 13c has a circular cylindrical shape protruding downward from a radial inner edge portion of the bottom wall portion 13a. The protruding cylinder portion 13c is open on both sides in the axial direction.

The second wiring holding portion 15 protrudes radially outward from the cylindrical portion 13b. In FIG. 2, the second wiring holding portion 15 protrudes from the cylinder portion 13b toward the negative side in the first direction X, that is, the same side as the side from which the first wiring holding portion 14 protrudes. The second wiring holding portion 15 is disposed below the first wiring holding portion 14. The second wiring holding portion 15 has, for example, a box shape which is hollow and is open on the upper side. The inside of the second wiring holding portion 15 is connected to the inside of the cylinder portion 13b. The second wiring holding portion 15 has a bottom wall portion 15a and a side wall portion 15b. The bottom wall portion 15a extends radially outward from the bottom wall portion 13a. In FIG. 2, the bottom wall portion 15a extends from the bottom wall portion 13a toward the negative side in the first direction X. The side wall portion 15b extends upward from an outer edge portion of the bottom wall portion 15a. In the embodiment, a bottom portion 13j of the deceleration mechanism case body 13i is configured by the bottom wall portion 13a and the bottom wall portion 15a.

The circular cylindrical member 16 has a circular cylindrical shape extending in the axial direction Z. More specifically, the circular cylindrical member 16 has a multistage circular cylindrical shape taking the central axis J1 as the center and being open on both sides in the axial direction. The circular cylindrical member 16 is made of metal. In the embodiment, the circular cylindrical member 16 is made of sheet metal. Therefore, the circular cylindrical member 16 can be made by pressing a metal plate, and the manufacturing cost of the circular cylindrical member 16 can be reduced. In the embodiment, the circular cylindrical member 16 is a nonmagnetic material.

The circular cylindrical member 16 is embedded in the deceleration mechanism case body 13i. The circular cylindrical member 16 has a large diameter portion 16a, a circular-annular portion 16b, and a small diameter portion 16c. The large diameter portion 16a is an upper part of the circular cylindrical member 16. The large diameter portion 16a is embedded in the cylinder portion 13b. An upper end portion of an inner peripheral surface of the large diameter portion 16a is exposed to the inside of the deceleration mechanism case 13.

As shown in FIG. 2, the circular-annular portion 16b is a circular annular part extending radially inward from a lower end portion of the large diameter portion 16a. In the embodiment, the circular-annular portion 16b has a circular annular plate shape with the central axis J1 as the center. The circular-annular portion 16b is disposed on the bottom wall portion 13a. In the embodiment, the circular-annular portion 16b is positioned on an upper surface of the bottom wall portion 13a. A radial outer edge portion of the circular-annular portion 16b is embedded in the cylinder portion 13b. A part of a top surface of the circular-annular portion 16b which is close to the radial inner side is exposed to the inside of the deceleration mechanism case 13. The circular-annular portion 16b covers a lower side of a first magnet 63 described later. The top surface of the circular-annular portion 16b is a flat surface orthogonal to the axial direction Z.

The small diameter portion 16c is a lower part of the circular cylindrical member 16. The small diameter portion 16c extends downward from the radial inner edge portion of the circular-annular portion 16b. An outer diameter and an inner diameter of the small diameter portion 16c are smaller than an outer diameter and an inner diameter of the large diameter portion 16a. The small diameter portion 16c is fitted inside the protruding cylinder portion 13c in the radial direction. A bush 54 being circular cylindrical and extending in the axial direction Z is disposed inside the small diameter portion 16c. The bush 54 is fitted into the small diameter portion 16c and is fixed inside the protruding cylinder portion 13c. The bush 54 has a bush flange portion 54a protruding radially outward at an upper end portion. The bush flange portion 54a is in contact with the top surface of the circular-annular portion 16b. Accordingly, the bush 54 is prevented from coming down from the inside of the small diameter portion 16c.

The deceleration mechanism case 13 has an opening portion 13h which is open upward. In the embodiment, the opening portion 13h is configured by the upper opening of the cylinder portion 13b and the upper opening of the second wiring holding portion 15. The motor case 12 and the deceleration mechanism case 13 are fixed to each other in a state that the opening portion 12g and the opening portion 13h face each other in the axial direction Z. In a state that the motor case 12 and the deceleration mechanism case 13 are fixed to each other, the inside of the opening portion 12g and the inside of the opening portion 13h are connected to each other.

In the embodiment, the motor case 12 and the deceleration mechanism case 13 are each made, for example, by insert molding. The motor case 12 is made by insert molding using the metal member 110 and a first wiring member 91 described later among the wiring members 90 as insert members. The deceleration mechanism case 13 is made by insert molding using the circular cylindrical member 16 and a second wiring member 92 described later among the wiring members 90 as insert members.

The case 11 has a concave portion 17 positioned on an outer surface of the case 11. In the embodiment, the concave portion 17 is arranged in the deceleration mechanism case 13. More specifically, the concave portion 17 is recessed upward from a lower surface of the bottom portion 13j. In the embodiment, the concave portion 17 is arranged across the bottom wall portion 13a and the bottom wall portion 15a. The concave portion 17 extends in the radial direction. In the embodiment, a direction in which the concave portion 17 extends is a direction parallel to the first direction X among the radial directions.

The bearing holder 100 is fixed to the motor case 12. The bearing holder 100 is made of metal. In the embodiment, the bearing holder 100 is made of sheet metal. Therefore, the bearing holder 100 can be made by pressing a metal plate, and manufacturing cost of the bearing holder 100 can be reduced. The bearing holder 100 includes the cylindrical holder cylinder portion 101 and a holder flange portion 102. In the embodiment, the holder cylinder portion 101 has a circular cylindrical shape with the central axis J1 as the center. The holder cylinder portion 101 holds the first bearing 51 on the radial inner side. The holder cylinder portion 101 is inserted into the hole portion 12h. The holder cylinder portion 101 protrudes further downward than the wall portion 12b from the inside of the control board housing portion 12f through the hole portion 12h.

An outer diameter of the holder cylinder portion 101 is smaller than an inner diameter of the hole portion 12h. Therefore, at least a part in the circumferential direction of a radial outer surface of the holder cylinder portion 101 is located at a position separated radially inward from a radial inner surface of the hole portion 12h. In the example shown in FIG. 2, the radial outer surface of the holder cylinder portion 101 is positioned away from the radial inner surface of the hole portion 12h radially inward over the entire circumference.

In the embodiment, the holder cylinder portion 101 has an outer cylinder portion 101a and an inner cylinder portion 101b. The outer cylinder portion 101a has a circular cylindrical shape extending downward from a radial inner edge portion of the holder flange portion 102. A radial outer surface of the outer cylinder portion 101a is the radially outer surface of the holder cylinder portion 101. The inner cylinder portion 101b has a circular cylindrical shape extending upward from a lower end portion of the outer cylinder portion 101a on a radial inner side of the outer cylinder portion 101a. The radial outer surface of the inner cylinder portion 101b is in contact with the radial inner surface of the outer cylinder portion 101a. Thus, strength of the holder cylinder portion 101 can be improved through configuring the holder cylinder portion 101 by overlapping the two cylinder portions in the radial direction. The first bearing 51 is held on the radial inner side of the inner cylinder portion 101b. An upper end portion of the inner cylinder portion 101b is positioned upper than the first bearing 51. The upper end portion of the inner cylinder portion 101b is positioned slightly lower than an upper end portion of the outer cylinder portion 101a.

The holder flange portion 102 extends radially outward from the holder cylinder portion 101. In the embodiment, the holder flange portion 102 extends radially outward from the upper end portion of the holder cylinder portion 101. The holder flange portion 102 has a circular annular plate shape with the central axis J1 as the center. The holder flange portion 102 is positioned above the wall portion 12b. The holder flange portion 102 fixed to the wall portion 12b. Accordingly, the bearing holder 100 is fixed to the motor case 12.

In the embodiment, the holder flange portion 102 is fixed to the wall portion 12b by a plurality of screw members tightened to the wall portion 12b in the axial direction Z. In this embodiment, the screw members which fix the holder flange portion 102 are tightened to the female screw portion of the metal member 110 on the wall portion 12b. Although illustration is omitted, for example, three screw members for fixing the holder flange portion 102 are arranged.

The holder flange portion 102 which is fixed by the screw members is in contact with the upper surface of the metal member 110. More specifically, in a lower surface of the holder flange portion 102, a peripheral edge portion of a penetrating portion through which the screw members penetrate is in contact with the upper surface of the metal member 110. The holder flange portion 102 is located at a position away from the wall portion body 12i toward the upper side. Therefore, the holder flange 102 can be precisely positioned in the axial direction Z by the metal member 110. In addition, the holder flange portion 102 can be suppressed from being inclined with respect to the axial direction Z. In addition, the holder flange portion 102 is not in direct contact with the wall portion body 12i. Therefore, even when a difference in thermal deformation occurs between the wall portion body 12i made of resin and the metal member 110 made of metal due to a difference in linear expansion coefficient, stress can be suppressed from being applied to the wall portion body 12i. Thereby, the wall portion body 12i can be suppressed from being damaged and the metal member 110 can be suppressed from coming off the wall portion body 12i.

The motor 20 has the motor shaft 21, a rotor body 22, and the stator 23. The motor shaft 21 rotates about the central axis J1. The motor shaft 21 is supported by the first bearing 51 and the second bearing 52 to be rotatable around the central axis J1. The first bearing 51 is held by the bearing holder 100 and rotatably supports a part of the motor shaft 21 which is closer to the upper side than the rotor body 22. The second bearing 52 supports a part of the motor shaft 21 closer to the lower side than the rotor body 22 to be rotatable with respect to the deceleration mechanism case 13.

An upper end of the motor shaft 21 protrudes further upward than the wall portion 12b through the hole portion 12h. The motor shaft 21 has an eccentric shaft portion 21a centered on an eccentric axis J2 which is eccentric with respect to the central axis J1. The eccentric shaft portion 21a is positioned closer to the lower side than the rotor body 22. An inner ring of the third bearing 53 is fitted and fixed to the eccentric shaft portion 21a. Thereby, the third bearing 53 is fixed to the motor shaft 21.

The rotor body 22 is fixed to the motor shaft 21. The motor 20 has a rotor including the motor shaft 21 and the rotor body 22. Although illustration is omitted, the rotor body 22 includes a rotor core being circular cylindrical and fixed to an outer peripheral surface of the motor shaft 21 and a magnet fixed to the rotor core. The stator 23 faces the rotor body 22 in the radial direction via a gap. The stator 23 surrounds the rotor body 22 on a radial outer side of the rotor body 22. The stator 23 includes a stator core 24 being annular and surrounding the radial outer side of the rotor body 22, an insulator 25 mounted to the stator core 24, and a plurality of coils 26 mounted to the stator core 24 via the insulator 25. The stator core 24 is fixed to the inner peripheral surface of the case cylinder portion 12a. Thereby, the motor 20 is held by the motor case 12.

The control portion 70 includes the control board 71, a second attachment member 73, a second magnet 74, and second rotation sensors 72. That is, the electric actuator 10 includes the control board 71, the second attachment member 73, the second magnet 74, and the second rotation sensors 72.

The control board 71 has a plate shape extending in a plane surface orthogonal to the axial direction Z. The control board 71 is housed in the motor case 12. More specifically, the control board 71 is housed inside the control board housing portion 12f and is arranged away from the wall portion 12b toward the upper side. The control board 71 is a board which is electrically connected to the motor 20. The coils 26 of the stator 23 are electrically connected to the control board 71. The control board 71 controls, for example, a current supplied to the motor 20. That is, for example, an inverter circuit is mounted on the control board 71.

The second attachment member 73 has a circular annular shape with the central axis J1 as the center. An inner peripheral surface of the second attachment member 73 is fixed to an upper end portion of the motor shaft 21. The second attachment member 73 is disposed above the first bearing 51 and the bearing holder 100. The second attachment member 73 is, for example, a nonmagnetic material. Furthermore, the second attachment member 73 may also be a magnetic material.

The second magnet 74 has a circular annular shape with the central axis J1 as the center. The second magnet 74 is fixed to an upper end surface of a radial outer edge portion of the second attachment member 73. A method for fixing the second magnet 74 to the second attachment member 73 is not particularly limited, and is, for example, adhesion with an adhesive. The second attachment member 73 and the second magnet 74 are rotated together with the motor shaft 21. The second magnet 74 is disposed above the first bearing 51 and the holder cylinder portion 101. The second magnet 74 has N poles and S poles alternately arranged along the circumferential direction.

The second rotation sensors 72 are sensors which detect the rotation of the motor 20. The second rotation sensors 72 are attached to a lower surface of the control board 71. The second rotation sensors 72 face the second magnet 74 in the axial direction Z via a gap. The second rotation sensors 72 detect a magnetic field generated by the second magnet 74. The second rotation sensors 72 are, for example, Hall elements. Although illustration is omitted, a plurality of second rotation sensors 72 are arranged along the circumferential direction; for example, three second rotation sensors 72 are arranged. The second rotation sensors 72 can detect the rotation of the motor shaft 21 by detecting a change in the magnetic field generated by the second magnet 74 which rotates together with the motor shaft 21.

The connector portion 80 is a part where connection with electrical wiring outside the case 11 is performed. The connector portion 80 is arranged in the motor case 12. The connector portion 80 includes the terminal holding portion 12d described above and the terminal 81. The terminal 81 is embedded and held in the terminal holding portion 12d. One end of the terminal 81 is fixed to the control board 71. The other end of the terminal 81 is exposed to the outside of the case 11 through the inside of the terminal holding portion 12d. In the embodiment, the terminal 81 is, for example, a bus bar.

An external power source is connected to the connector portion 80 via an electrical wiring (not shown). More specifically, the external power source is attached to the terminal holding portion 12d, and the electrical wiring of the external power source is electrically connected to a part of the terminal 81 protruding into the terminal holding portion 12d. Accordingly, the terminal 81 electrically connects the control board 71 and the electrical wiring. Therefore, in the embodiment, power is supplied from the external power source to the coils 26 of the stator 23 via the terminal 81 and the control board 71.

The deceleration mechanism 30 is disposed on a radial outer side of a lower part of the motor shaft 21. The deceleration mechanism 30 is housed inside the deceleration mechanism case 13. The deceleration mechanism 30 is disposed between the bottom wall portion 13a (and the circular-annular portion 16b) and the motor 20 in the axial direction Z. The deceleration mechanism 30 includes an external gear 31, an internal gear 33, and an output flange portion 42.

The external gear 31 has a substantially circular annular plate shape which extends in a plane surface orthogonal to the axial direction Z with the eccentric axis J2 of the eccentric shaft portion 21a as the center. A gear portion is arranged on a radial outer surface of the external gear 31. The external gear 31 is coupled to the eccentric shaft portion 21a via the third bearing 53. Thereby, the deceleration mechanism 30 is coupled to the lower part of the motor shaft 21. The external gear 31 is fitted to an outer ring of the third bearing 53 from the radial outer side. Thereby, the third bearing 53 couples the motor shaft 21 and the external gear 31 so that the motor shaft 21 and the external gear 31 are relatively rotatable about the eccentric axis J2.

As shown in FIG. 2, the external gear 31 has a plurality of through holes 31a which penetrate the external gear 31 in the axial direction. The plurality of through holes 31a is arranged along the circumferential direction. More specifically, the plurality of through holes 31a is arranged at equal intervals over the entire circumference along the circumferential direction with the eccentric axis J2 as the center. For example, eight through holes 31a are arranged.

The internal gear 33 is fixed by surrounding a radial outer side of the external gear 31 and meshes with the external gear 31. The internal gear 33 has a circular annular shape with the central axis J1 as the center. As shown in FIG. 2, the internal gear 33 is positioned on a radial inner side of an upper end portion of the circular cylindrical member 16. The internal gear 33 is fixed to an inner peripheral surface of the circular cylindrical member 16 made of metal. Therefore, the internal gear 33 can be firmly fixed to the deceleration mechanism case 13 while the deceleration mechanism case body 13i is made of resin. Thereby, the internal gear 33 can be suppressed from moving with respect to the deceleration mechanism case 13, and shift of the position of the internal gear 33 can be suppressed. In the embodiment, the internal gear 33 is fixed to the inner peripheral surface of the large diameter portion 16a by press fitting. In this way, the deceleration mechanism 30 is fixed to the inner peripheral surface of the circular cylindrical member 16 and is held by the deceleration mechanism case 13. A gear portion is arranged on an inner peripheral surface of the internal gear 33. The gear portion of the internal gear 33 meshes with the gear portion of the external gear 31. More specifically, the gear portion of the internal gear 33 partially meshes with the gear portion of the external gear 31.

The output flange portion 42 is a part of the output portion 40. The output flange portion 42 is positioned below the external gear 31. The output flange portion 42 has a circular annular plate shape which expands in the radial direction with the central axis J1 as a center. The output flange portion 42 expands radially outward from an upper end portion of an output shaft 41 described later. As shown in FIG. 2, the output flange portion 42 is in contact with the bush flange portion 54a from the upper side.

The output flange portion 42 has a plurality of through holes 42a which penetrates the output flange portion 42 in the axial direction Z. Although illustration is omitted, the plurality of through holes 42a is arranged along the circumferential direction. More specifically, the plurality of through holes 42a is arranged at equal intervals over the entire circumference along the circumferential direction with the central axis J1 as the center. For example, eight through holes 42a are arranged.

Column members 43 are inserted into each through hole 42a of the output flange portion 42. The plurality of column members 43 is columnar members extending in the axial direction Z. The column members 43 are fixed to the output flange portion 42 by press fitting, adhesion, screw fastening, or the like. The column members 43 protrude upward from a top surface of the output flange portion 42. The plurality of column members 43 is arranged along the circumferential direction. More specifically, the plurality of column members 43 is arranged at equal intervals over the entire circumference along the circumferential direction with the central axis J1 as the center.

The column members 43 extend upward from the output flange portion 42 and are inserted respectively into the plurality of through holes 31a of the external gear 31. The diameter of the through holes 31a is larger than the diameter of the column member 43. The column members 43 disposed inside the through holes 31a are capable of performing circular motion along inner peripheral surfaces of the through holes 31a. With this configuration, the external gear 31 swings around the central axis J1.

The output portion 40 is a part which outputs a driving force of the electric actuator 10. The output portion 40 is housed in the deceleration mechanism case 13. The output portion 40 includes the output shaft 41 and the output flange portion 42. That is, the electric actuator 10 includes the output shaft 41 and the output flange portion 42. In the embodiment, the output portion 40 is a single member.

The output shaft 41 below the motor shaft 21 extends in the axial direction Z of the motor shaft 21. The output shaft 41 has a circular cylindrical portion 41a and an output shaft body portion 41b. The circular cylindrical portion 41a has a circular cylindrical shape which extends downward from an inner edge of the output flange portion 42. The circular cylindrical portion 41a has a circular cylindrical shape having a bottom and being open on an upper side. The circular cylindrical portion 41a is fitted to the radial inner side of the bush 54. Accordingly, the output shaft 41 is rotatably supported by the circular cylindrical member 16 via the bush 54. As described above, the deceleration mechanism 30 is fixed to the circular cylindrical member 16. Therefore, the reduction mechanism 30 and the output shaft 41 can be supported together by the circular cylindrical member 16 made of metal. Thereby, the deceleration mechanism 30 and the output shaft 41 can be arranged with high axial precision.

The second bearing 52 is housed inside the circular cylindrical portion 41a. An outer ring of the second bearing 52 is fitted inside the circular cylindrical portion 41a. Thereby, the second bearing 52 couples the motor shaft 21 and the output shaft 41 so that the motor shaft 21 and the output shaft 41 are rotatable relative to each other. A lower end portion of the motor shaft 21 is positioned inside the circular cylindrical portion 41a. A lower end surface of the motor shaft 21 faces a top surface of the bottom portion of the circular cylindrical portion 41a via a gap.

The output shaft body portion 41b extends downward from the bottom portion of the circular cylindrical portion 41a. In the embodiment, the output shaft body portion 41b has a columnar shape with the central axis J1 as the center. An outer diameter of the output shaft body portion 41b is smaller than an outer diameter and an inner diameter of the circular cylindrical portion 41a. A lower end portion of the output shaft body portion 41b protrudes further downward than the protruding cylinder portion 13c. Another member which outputs the driving force of the electric actuator 10 is attached to the lower end portion of the output shaft body portion 41b.

When the motor shaft 21 is rotated about the central axis J1, the eccentric shaft portion 21a revolves in the circumferential direction with the central axis J1 as the center. The revolution of the eccentric shaft portion 21a is transmitted to the external gear 31 via the third bearing 53, and the external gear 31 *swings* while an inscribed position between an inner peripheral surface of the through hole 42a and an outer peripheral surface of the column member 43 changes. Accordingly, the position where the gear portion of the external gear 31 and the gear portion of the internal gear 33 mesh with each other changes in the circumferential direction. Therefore, a rotational force of the motor shaft 21 is transmitted to the internal gear 33 via the external gear 31.

Here, in the embodiment, since the internal gear 33 is fixed, the internal gear 33 does not rotate. Therefore, the external gear 31 rotates around the eccentric axis J2 due to a reaction force of the rotational force transmitted to the internal gear 33. At this time, a rotating direction of the external gear 31 is opposite to a rotating direction of the motor shaft 21. The rotation of the external gear 31 around the eccentric axis J2 is transmitted to the output flange portion 42 via the through hole 42a and the column member 43. Thereby, the output shaft 41 rotates around the central axis J1. In this way, the rotation of the motor shaft 21 is transmitted to the output shaft 41 via the deceleration mechanism 30.

The rotation of the output shaft 41 is decelerated with respect to the rotation of the motor shaft 21 by the reduction mechanism 30. Specifically, in the configuration of the deceleration mechanism 30 of the embodiment, a reduction ratio R of the rotation of the output shaft 41 with respect to the rotation of the motor shaft 21 is represented by $R=-(N2-N1)/N1$. The negative sign at the head of the expression representing the reduction ratio R indicates that the direction of rotation of the output shaft 41 which is decelerated is opposite to the direction of the rotation of the motor shaft 21. N1 is the number of teeth of the external gear 31, and N2 is the number of teeth of the internal gear 33. As an example, when the number of teeth N1 of the external gear 31 is 59 and the number of teeth N2 of the internal gear 33 is 60, the reduction ratio R is $-1/59$.

Thus, according to the reduction mechanism 30 of the embodiment, the reduction ratio R of the rotation of the output shaft 41 with respect to the rotation of the motor shaft 21 can be made relatively large. Therefore, a rotational torque of the output shaft 41 can be made relatively large.

The wiring member 90 is electrically connected to a first rotation sensor 61 described later. In the embodiment, the wiring member 90 is a member for connecting the first rotation sensor 61 of the rotation detection device 60 and the control board 71 of the control portion 70. In the embodiment, the wiring member 90 is an elongated and plate-like bus bar. Although illustration is omitted, in the embodiment, three wiring members 90 are arranged. Each wiring member 90 is respectively configured in a manner that a first wiring member 91 and a second wiring member 92 are connected.

The first wiring member 91 extends from the inside of the second wiring holding portion 15 to the inside of the control board housing portion 12f. A part of the first wiring member 91 is embedded in the first wiring holding portion 14, the case cylinder portion 12a, and the wall part body 12i. Thereby, the first wiring member 91 is held by the motor case 12.

A lower end portion 91a of the first wiring member 91 protrudes downward from the first wiring holding portion 14 and is positioned inside the second wiring holding portion 15. An upper end portion 91b of the first wiring member 91 protrudes upward from the wall portion body 12i and is connected to the control board 71. Thereby, the first wiring member 91 is electrically connected to the control board 71 and is electrically connected to the electrical wiring outside the case 11 via the connector portion 80.

A part of the second wiring member 92 is embedded in the bottom portion 13j. Thereby, the second wiring member 92 is held by the deceleration mechanism case 13. An upper end portion 92a of the second wiring member 92 protrudes upward from the bottom wall portion 15a. The upper end portion 92a of the second wiring member 92 is connected to the lower end portion 91a of the first wiring member 91. A lower end portion 92b of the second wiring member 92 penetrates the bottom portion 13j and protrudes into the concave portion 17. The lower end portion 92b corresponds to one end portion of the wiring member 90. Thereby, the wiring member 90 penetrates the case 11 from the inside of the case 11, and one end portion of the wiring member 90 protrudes into the concave portion 17.

The rotation detection device 60 detects the rotation of the output portion 40. The rotation detection device 60 includes the first magnet 63, a covering portion 62, and the first rotation sensor 61. The first magnet 63 has a circular annular shape with centered on the central axis J1 as the center. The first magnet 63 is attached to the output portion 40. The first magnet 63 is positioned below a lower surface 42b of the output flange portion 42. A lower end portion of the first magnet 63 faces an upper side of the circular-annular portion 16b via a gap.

The first rotation sensor 61 is positioned inside the concave portion 17. The first rotation sensor 61 is positioned below the first magnet 63 with the circular-annular portion 16b clamped therebetween. The first rotation sensor 61 is a magnetic sensor which detects a magnetic field generated by the first magnet 63. The first rotation sensor 61 is, for example, a Hall element. The first rotation sensor 61 can detect the rotation of the output portion 40 by detecting a change in the magnetic field generated by the first magnet 63 which rotates together with the output portion 40. Here, according to the embodiment, the circular cylindrical member 16 is a non-magnetic material. Therefore, even if the circular cylindrical member 16 is positioned between the first magnet 63 and the first rotation sensor 61, detection precision of the magnetic field of the first magnet 63 by the first rotation sensor 61 can be suppressed from decreasing.

The covering portion 62 is positioned inside the concave portion 17. In the embodiment, the covering portion 62 is filled inside the concave portion 17. The covering portion 62 is made of resin. The lower end portion 92b of the second wiring member 92, that is, the one end portion of the wiring member 90 and the first rotation sensor 61 are embedded and covered in the covering portion 62. Therefore, moisture or the like can be prevented from coming into contact with the one end portion of the wiring member 90 and the first rotation sensor 61 positioned in the concave portion 17.

The disclosure is not limited to the above-described embodiment, and other configurations can also be employed.

In the above embodiment, the thick part of the lid 12c is configured by the base portion 200 protruding downward from the top plate portion 125, but a configuration is also possible in which an annular thick part which protrudes upward from a surface facing an upper side of the top plate portion 125 is arranged in the region overlapping the annular groove portion 123 in the axial direction.

In addition, in the above embodiment, the ribs 203a to 203d, 204a to 204d, and 205 are arranged on the surface facing the lower side of the top plate portion 125, but a configuration is also possible in which there are ribs on a surface facing an upper side of the top plate portion 125.

In addition, the use of the electric actuator of the above-described embodiment is not limited, and the electric actuator of the above-described embodiment may be mounted on any equipment. The electric actuator of embodiment mentioned above is mounted, for example, on a vehicle. In addition, each configuration described in this specification can be suitably combined in a range in which the configurations are not mutually contradictory.

What is claimed is:

1. An electric actuator, comprising:
a motor which has a rotor having a motor shaft extending along a central axis and a stator facing the rotor in a radial direction,
a motor case for housing the motor, and
a deceleration mechanism coupled to one axial side of the motor shaft;
wherein the motor case has:
a case cylinder portion which houses the stator and has an opening portion being open to the other axial side,
a lid which covers the opening portion of the case cylinder portion, and
a plurality of screws for fastening the lid to the case cylinder portion;
wherein the case cylinder portion has a plurality of screw fixing portions having screw holes which are open on an end surface of the other axial side of the case cylinder portion;
wherein the lid has:
a top plate portion covering the opening portion of the case cylinder portion,
an outer cylinder portion extending in an axial direction from an outer peripheral edge of the top plate portion and surrounding the case cylinder portion from a radial outer side,
an annular groove portion which is positioned inside the outer cylinder portion and faces the end surface on the other axial side of the case cylinder portion in the axial direction, and
a seal member which is housed in the annular groove portion and seals the opening portion of the case cylinder portion;
and wherein, in the lid, an axial thickness of a region which overlaps the annular groove portion as viewed in the axial direction is larger than an axial thickness of the top plate portion,
wherein the annular groove portion is a groove portion taking the outer cylinder portion and an inner cylinder portion as side walls, and the inner cylinder portion is positioned at a radial inner side of the outer cylinder portion and extends in the axial direction; and
an axial length of the outer cylinder portion is larger than an axial length of the inner cylinder portion,
wherein in a state that the lid is attached to the case cylinder portion, an upper end of the case cylinder portion is disposed inside the annular groove portion.

2. The electric actuator according to claim 1, wherein the lid has a base portion being annular and protruding from the top plate portion toward the one axial side in the region which overlaps the annular groove portion as viewed in the axial direction.

3. The electric actuator according to claim 2, wherein the lid has a rib protruding from the top plate portion toward the one axial side, and
the rib is connected to a plurality of locations on a side surface facing a radial inner side of the base portion.

4. The electric actuator according to claim 1, wherein the lid has screw insertion holes which penetrate the top plate portion and are open towards the end surface of the other axial side of the case cylinder and into the annular groove portion.

5. The electric actuator according to claim 4, wherein a base portion has a plurality of protrusion portions protruding radially inward, and
the screw insertion holes penetrate at least a part of the protrusion portions in the axial direction.

6. The electric actuator according to claim 5, wherein the lid has a plurality of ribs which protrudes from the top plate portion toward the one axial side, and
the plurality of ribs connects the plurality of protrusion portions to each other.

7. An electric actuator, comprising:
a motor which has a rotor having a motor shaft extending along a central axis and a stator facing the rotor in a radial direction,
a motor case for housing the motor, and
a deceleration mechanism coupled to one axial side of the motor shaft;
wherein the motor case has:
a case cylinder portion which houses the stator and has an opening portion being open to the other axial side,
a lid which covers the opening portion of the case cylinder portion, and
a plurality of screws for fastening the lid to the case cylinder portion;
wherein the case cylinder portion has a plurality of screw fixing portions having screw holes which are open on an end surface of the other axial side of the case cylinder portion;
wherein the lid has:
a top plate portion covering the opening portion of the case cylinder portion,
an outer cylinder portion extending in an axial direction from an outer peripheral edge of the top plate portion and surrounding the case cylinder portion from a radial outer side,
an annular groove portion which is positioned inside the outer cylinder portion and faces the end surface on the other axial side of the case cylinder portion in the axial direction, and
a seal member which is housed in the annular groove portion and seals the opening portion of the case cylinder portion;
and wherein, in the lid, an axial thickness of a region which overlaps the annular groove portion as viewed in the axial direction is larger than an axial thickness of the top plate portion
wherein the lid has a base portion being annular and protruding from the top plate portion toward the one axial side in the region which overlaps the annular groove portion as viewed in the axial direction,
wherein the lid has a rib protruding from the top plate portion toward the one axial side, and
the rib is connected to a plurality of locations on a side surface facing a radial inner side of the base portion.

8. An electric actuator, comprising:
a motor which has a rotor having a motor shaft extending along a central axis and a stator facing the rotor in a radial direction,
a motor case for housing the motor, and
a deceleration mechanism coupled to one axial side of the motor shaft;
wherein the motor case has:
- a case cylinder portion which houses the stator and has an opening portion being open to the other axial side,
- a lid which covers the opening portion of the case cylinder portion, and
- a plurality of screws for fastening the lid to the case cylinder portion;

wherein the case cylinder portion has a plurality of screw fixing portions having screw holes which are open on an end surface of the other axial side of the case cylinder portion;
wherein the lid has:
- a top plate portion covering the opening portion of the case cylinder portion,
- an outer cylinder portion extending in an axial direction from an outer peripheral edge of the top plate portion and surrounding the case cylinder portion from a radial outer side,
- an annular groove portion which is positioned inside the outer cylinder portion and faces the end surface on the other axial side of the case cylinder portion in the axial direction, and
- a seal member which is housed in the annular groove portion and seals the opening portion of the case cylinder portion;

and wherein, in the lid, an axial thickness of a region which overlaps the annular groove portion as viewed in the axial direction is larger than an axial thickness of the top plate portion,
wherein the lid has screw insertion holes which penetrate the top plate portion and are open towards the end surface of the other axial side of the case cylinder and into the annular groove portion.

* * * * *